J. PETERSON.
TILLING MACHINE.
APPLICATION FILED JUNE 29, 1912.

1,084,478.

Patented Jan. 13, 1914.
2 SHEETS—SHEET 1.

Witnesses
Samuel E. Wade
James Koerg

Inventor
James Peterson,
By Victor J. Evans
Attorney

J. PETERSON.
TILLING MACHINE.
APPLICATION FILED JUNE 29, 1912.
1,084,478.
Patented Jan. 13, 1914.
2 SHEETS—SHEET 2.
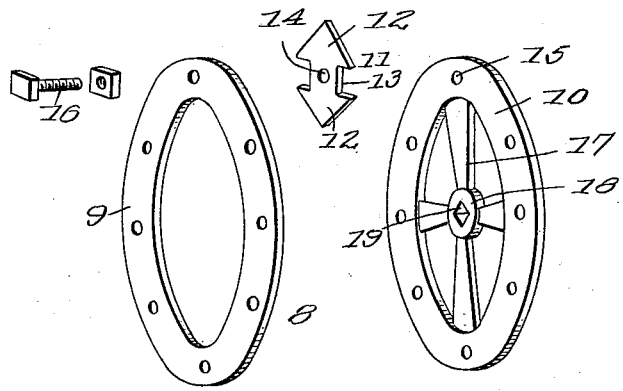
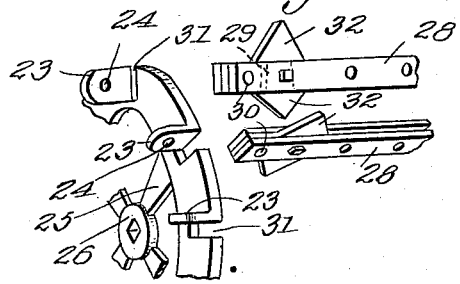
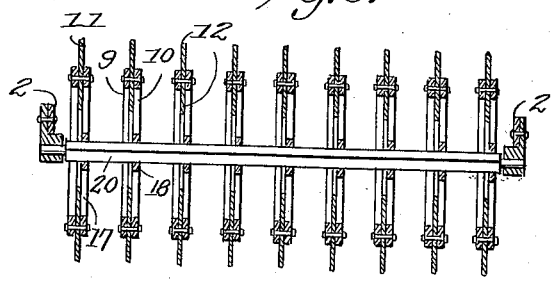
Witnesses
Samuel E. Wade
James Koenig
Inventor
James Peterson,
By Victor J. Evans
Attorney

UNITED STATES PATENT OFFICE.

JAMES PETERSON, OF FAITH, ALBERTA, CANADA.

TILLING-MACHINE.

1,084,478.   Specification of Letters Patent.   Patented Jan. 13, 1914.

Application filed June 29, 1912. Serial No. 706,720.

*To all whom it may concern:*

Be it known that I, JAMES PETERSON, a subject of the King of Great Britain, residing at Faith, in the Province of Alberta, Dominion of Canada, have invented new and useful Improvements in Tilling-Machines, of which the following is a specification.

This invention relates to tilling machines, and has for an object to provide apparatus of this character which will include means whereby the land can be broken or divided into substantially square-like portions which may be operated upon subsequently by the harrow structure of the machine so as to effect a perfect pulverization of the land prior to the planting of the seed.

Another object of the invention is to provide a machine in which the revolving cutters include cutting teeth having reversible points, whereby the cutters can be adjusted to present the sharp portions of the teeth as the occasion may demand.

Figure 1:
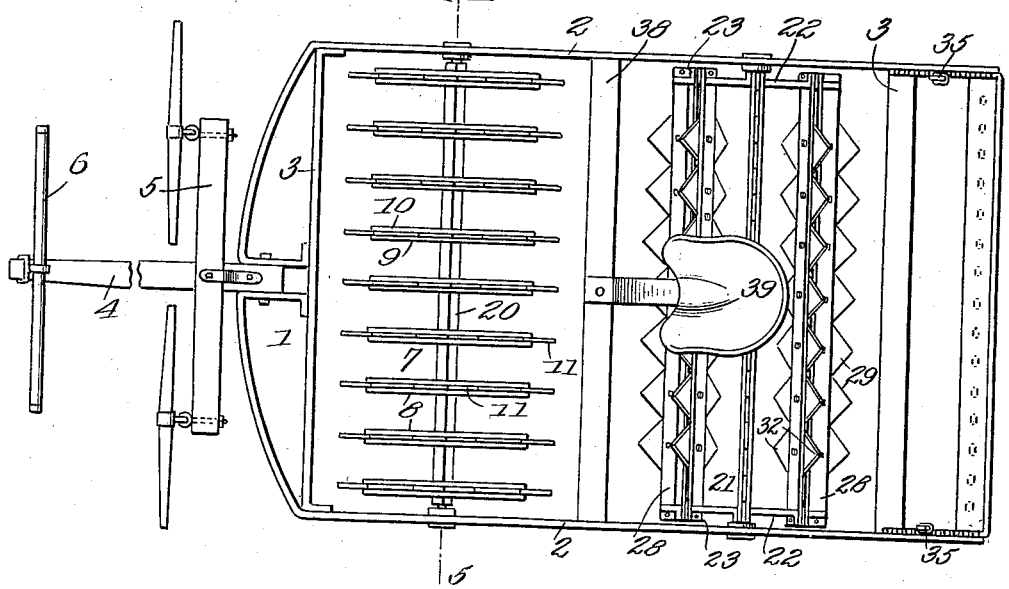
Figure 2:
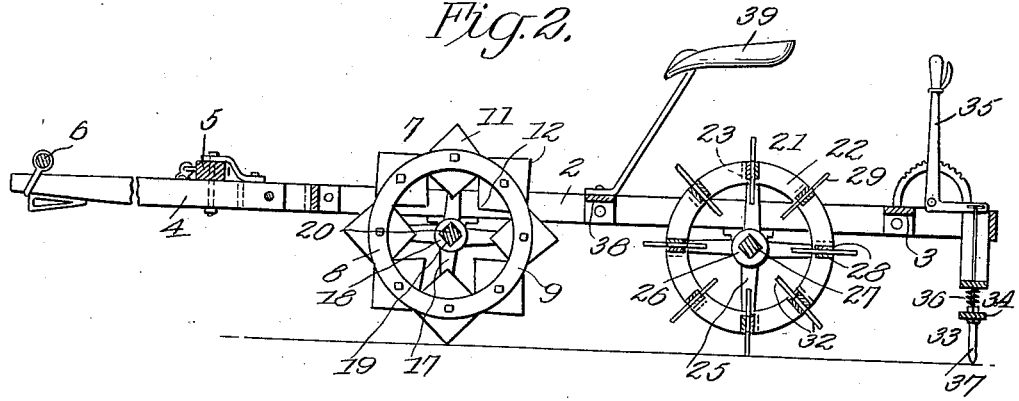

In the drawings, forming a portion of this specification and in which like numerals of reference indicate similar parts in the several views: Figure 1 is a top plan view of the tilling machine. Fig. 2 is a longitudinal section therethrough. Fig. 3 is a perspective view of a portion of one of the cutting rolls. Fig. 4 is a perspective view of the tooth holder of one of the rolls showing the parts thereof separated. Fig. 5 is a longitudinal section taken on line 5—5 of Fig. 1.

My improved tilling machine comprises a frame 1 which includes the side bars 2 and the connecting brace bars 3. At the front end the frame 1 has pivotally supported thereon a draft tongue 4 on which is mounted such draft appliances as the doubletree 5 and the neck yoke 6.

In operation of the machine, the ground is first cut so as to form therein longitudinal relatively narrow furrows, and in view thereof, I provide the machine with the front cutting roll 7 which includes a series of teeth clamps 8, such as shown in detail in Fig. 4, each clamp being formed preferably of the companion rings 9 and 10 between which the teeth 11 are adapted to be securely clamped. The teeth are substantially of frusto-triangular construction so as to provide the oppositely extending points 12. These points are connected with each other by the intermediate shank 13 in which is formed the opening 14. The clamping members 9 and 10 are provided with alining openings 15 to register with the opening 14 and to receive therewith the clamping bolt 16. This construction is such that the teeth are reversible so that when one point becomes worn the teeth can be adjusted to expose the companion points. The ring-like clamping members 10 of the front roller are provided with radial spokes 17 and a central hub 18, the latter having the squared opening 19 therein which receives the squared shaft 20, the ends of the latter being revolubly mounted in suitable bearings in the side bars 2 so that the roller can freely revolve. The cutting edges of the teeth 11 are disposed parallel to the line of draft of the machine so that the desired longitudinal cut of the ground can be made.

In order that the ground can be completely loosened and cut into small blocks, I provide a follower cutting roller 21. This roller comprises the ring-like members 22 whose rim portions are provided with angularly disposed lugs 23 having openings 24 therein. The members 22 are provided with radial spokes 25 and the central hub portions 26. A squared shaft 27 extends through the passages in the hubs 26 and the ends of the shaft are mounted in suitable bearings in the side bars 2 of the frame 1 so that the follower roller can freely revolve therein. The teeth clamps are formed of longitudinal bars 28 between which the teeth 29 are removably secured. The ends of these clamps are apertured, at 30, and the said apertures are adapted to aline with the apertures 24 in the ears 23. The members 22 are provided with radial slots 31 in which the teeth clamping members are adapted to fit, as clearly shown.

The construction of the follower roller is such that the teeth 29 thereof form substantially shovel-like elements which are adapted to dig beneath the ground in line with the longitudinal cuts made by the teeth 11 on the front roller of the machine so that the ground will be thoroughly loosened for subsequent treatment by the harrow. The teeth 29 are identical in construction with the teeth 11, each being provided with the reversible points 32, as shown. The teeth 29 are disposed at right angles to the cutting edges of the teeth 11.

The harrow 33 comprises a frame including the tooth bar 34. This frame is adjustably mounted upon the frame 1 and it is disposed in rear of the following roller 21. A controlling lever 35 is operatively connected with the harrow frame so that the latter can be adjusted as the occasion may demand. Springs 36 are employed for yieldingly holding the harrow to its work and their use provides means whereby the harrow is free to yield when passing over obstructions so as to not injure the teeth. The teeth 37 on the harrow frame may be of any suitable well known construction which will cause the soil to be perfectly pulverized as the machine is propelled across the field. A combined seat and foot bar 38 extends across the frame 1 at a point substantially between the roller 7 and the roller 21. This bar has the operator's seat 39 operatively mounted thereon.

I claim:

1. A cutting element for soil tilling machines comprising apertured sectional clamping devices, teeth having centrally disposed apertures disposed between the sections of said clamping devices with the apertures thereof in alinement with the apertures of said clamping devices, and means passing through the alined apertures of the teeth and sectional clamping devices for removably securing the teeth thereto and permitting reversal of the teeth, the cutting edges of the teeth being disposed beyond the outer and inner edges of the clamping sections.

2. A roller for soil tilling machines comprising ring like members provided with angularly disposed apertured lugs, a pair of clamping members, detachably secured to said lugs, removable cutting teeth arranged between said members, the cutting edges of the teeth being disposed beyond the outer and inner edges of the clamping members.

In testimony whereof I affix my signature in presence of two witnesses.

JAMES PETERSON.

Witnesses:
W. B. GILRIE,
SAM HULBERG.

---

Copies of this patent may be obtained for five cents each, by addressing the "Commissioner of Patents, Washington, D. C."